United States Patent [19]

Murayama et al.

[11] Patent Number: 5,291,287

[45] Date of Patent: Mar. 1, 1994

[54] VERTICAL SYNCHRONIZATION PROCESSING CIRCUIT

[75] Inventors: Hiroshi Murayama; Akira Shirahama, both of Kanagawa; Takahiko Tamura; Yumiko Mito, both of Tokyo; Shinichirou Miyazaki, Kanagawa, all of Japan

[73] Assignee: Sony Corporation, Tokyo, Japan

[21] Appl. No.: 888,500

[22] Filed: May 27, 1992

[30] Foreign Application Priority Data

May 28, 1991 [JP] Japan ................... 3-123867

[51] Int. Cl.⁵ .............................................. H04N 5/04
[52] U.S. Cl. ...................................... 348/536; 348/533
[58] Field of Search .................. 358/148, 158, 155; H04N 5/04

[56] References Cited

U.S. PATENT DOCUMENTS

| 4,025,951 | 5/1977 | Eckenbrecht . |
| 4,228,461 | 10/1980 | Weissmuller ............ 358/148 |
| 4,231,064 | 10/1980 | Uchida ................... 358/158 |
| 4,556,905 | 12/1985 | Ikejiri .................... 358/158 |
| 4,843,469 | 6/1989 | Boyce .................... 558/149 |

FOREIGN PATENT DOCUMENTS

| 099611 | 7/1983 | European Pat. Off. . |
| 289322 | 4/1988 | European Pat. Off. . |
| 342634 | 5/1989 | European Pat. Off. . |
| 0119578 | 9/1981 | Japan ................... 358/158 |

OTHER PUBLICATIONS

Patent Abstracts of Japan, vol. 10, No. 359, Dec. 3, 1986 (Mitsushige).

*Primary Examiner*—Victor R. Kostak
*Assistant Examiner*—David E. Harvey
*Attorney, Agent, or Firm*—Lewis H. Eslinger; Jay H. Maioli

[57] ABSTRACT

A vertical synchronization processing circuit includes a counter for counting a clock signal synchronized with a horizontal sync. signal, a circuit for resetting the counter in response to a vertical synchronization signal within a predetermined limit prohibiting reset due to a non-standard signal, a memory for storing the data counted at the timing of reset, and a circuit for changing a predetermined limit prohibiting reset due to a non-standard signal according to the data from the memory. A circuit for discriminating an existence of a vertical synchronization interval can also be provided along with a second resetting circuit for resetting the counter if the discriminating circuit detects the existence of the vertical synchronization interval when the counter counts a predetermined number of clock signals in case there is not a vertical synchronization pulse within the predetermined limit.

4 Claims, 9 Drawing Sheets

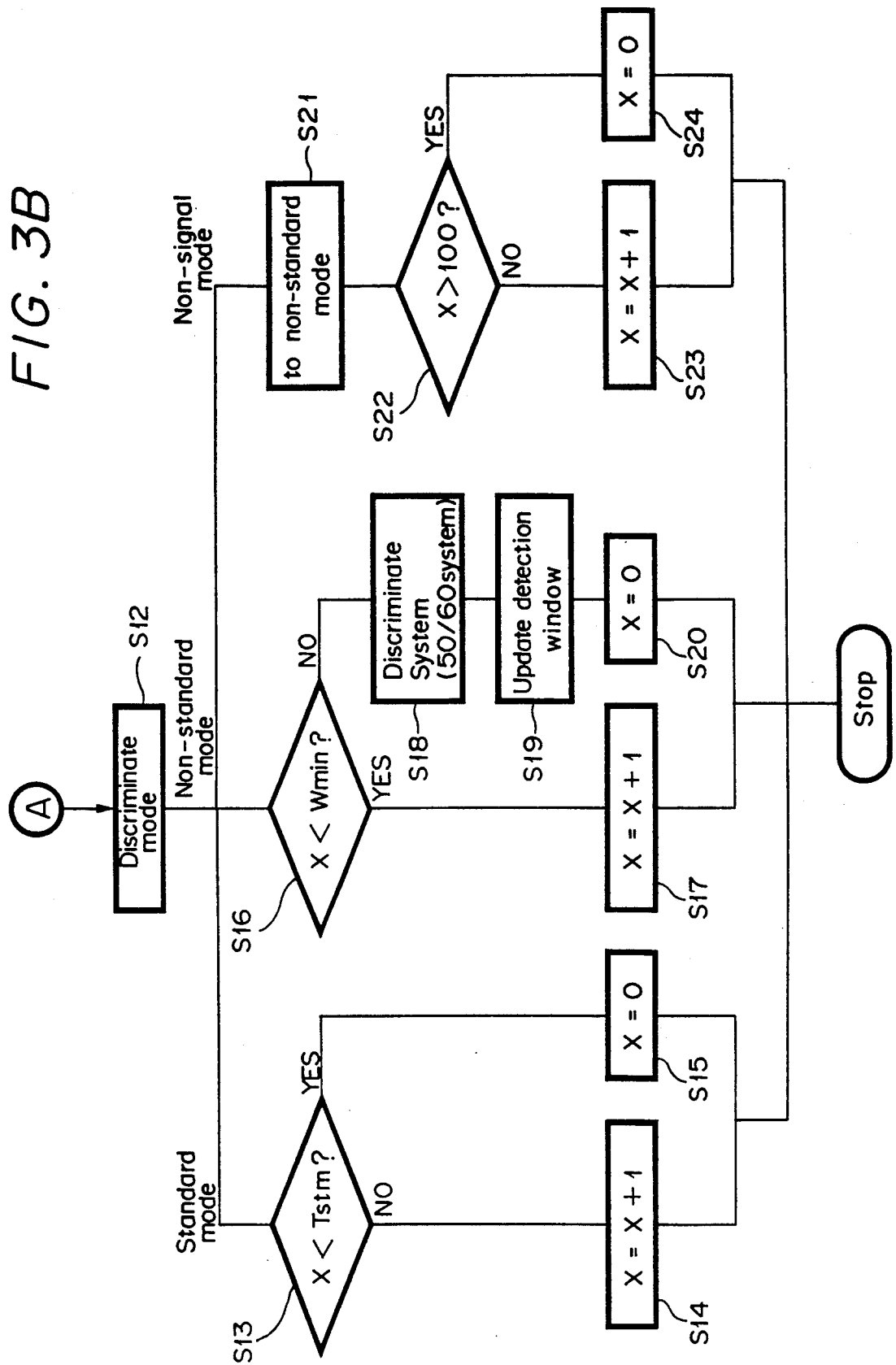

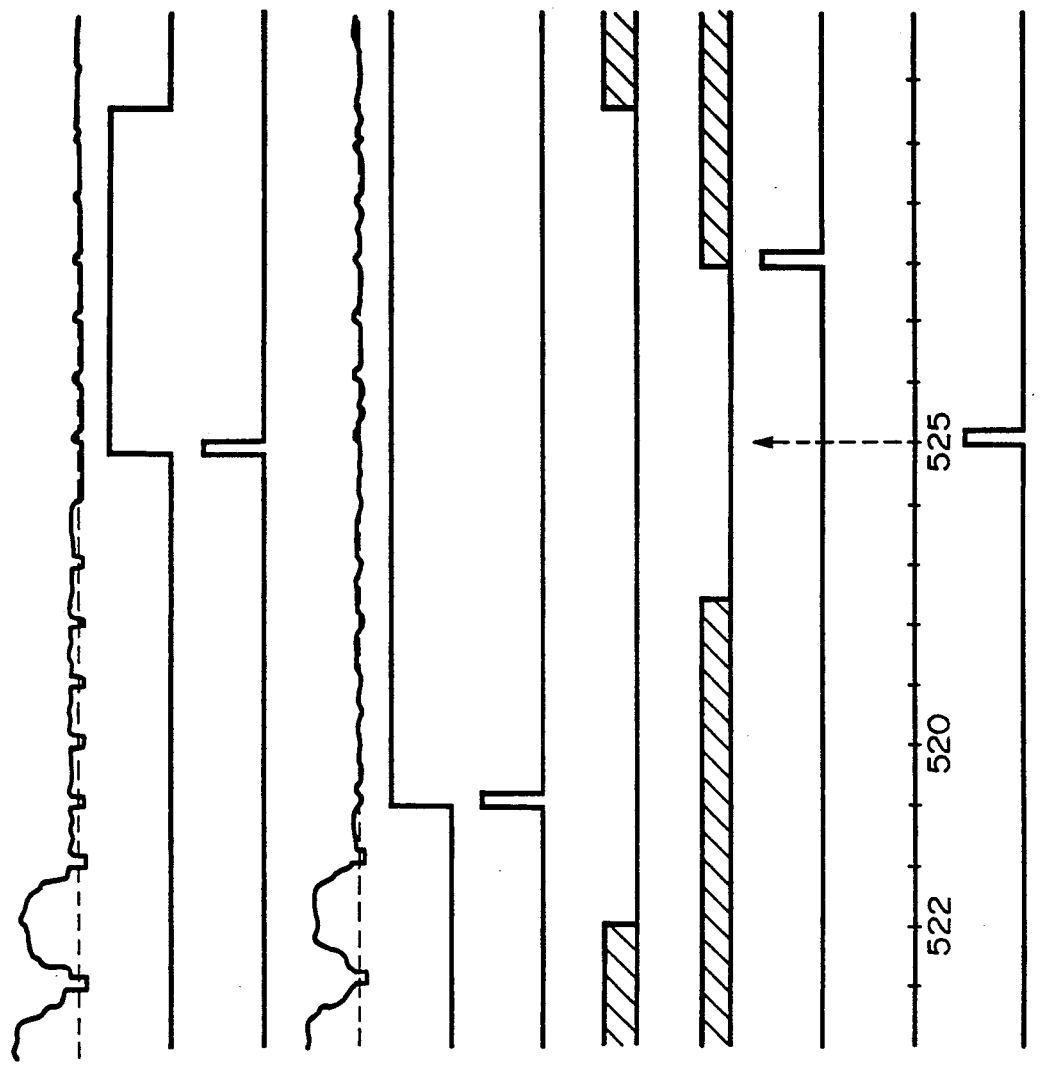

VERTICAL SYNCHRONIZATION PROCESSING CIRCUIT

BACKGROUND OF THE INVENTION

1. Field of the Invention

The present invention relates generally to vertical synchronization processing circuits and, more particularly, to a vertical synchronization processing circuit for use in monitor receivers or the like.

2. Description of the Prior Art

Vertical synchronization processing circuits for use in a monitor receiver or the like are proposed to count a horizontal synchronizing signal and generate a vertical synchronization timing signal or the like from the count value (known as "count down processing").

FIG. 1 of the accompanying drawings shows in block form an arrangement of a conventional vertical synchronization processing apparatus.

Referring to FIG. 1, a vertical synchronizing signal applied to an input terminal 61 is supplied through an input inhibit gate 62 to a reset terminal of a counter 63. A clock signal synchronized with a horizontal synchronizing signal is supplied from a terminal 64 to the counter 63 and is thereby counted. When a count value reaches a predetermined value, a vertical deflection timing signal, for example, is developed at an output terminal 65 from the counter 63. Further, this count value is supplied to a window setting logic circuit 66 which then forms a detection window of the vertical synchronizing signal. The detection window is supplied to the input inhibit gate 62. When the vertical synchronizing signal is not detected during the detection window period, then a reset signal corresponding to the end of the detection window period is supplied from the logic circuit 66 to the reset terminal of the counter 63.

In the above-mentioned conventional apparatus, however, the detection window is formed of a hard logic so that only detection windows of about one to three kinds in a fixed range can be provided. On the other hand, the detection window cannot be reduced too much in width because a non-standard signal such as signals used in a variable speed playback mode of a video tape recorder must be taken into consideration. There is then the large possibility that a noise or the like, which might be mis-detected, occurs in the vertical synchronizing signal within the detection window. Therefore, there is then the large risk such that a malfunction or the like occurs due to the mis-detection.

Further, in the above-mentioned conventional apparatus, when the vertical synchronizing signal is not detected within the detection window, the counter 63 is reset at the end of the detection window period and the vertical synchronizing signal is interpolated by this resetting of the counter 63. As a result, a jitter component occurred due to this interpolation. Further, since distributions of vertical synchronizing signals are different depending upon input signals, the distribution is not always located at the center of the detection window. Therefore, it is frequently observed that the amount of jitter components is changed when the distribution of the vertical synchronizing signal is located in the first or second half of the detection window.

OBJECTS AND SUMMARY OF THE INVENTION

Therefore, it is an object of the present invention to provide an improved vertical synchronization processing circuit in which the aforesaid shortcomings and disadvantages encountered with the prior art can be eliminated.

More specifically, it is an object of the present invention to provide a vertical synchronization processing circuit of simple arrangement which can effect a satisfactory vertical synchronization processing on a nonstandard signal.

As a first aspect of the present invention, a vertical synchronization processing circuit is comprised of a counter for counting a clock signal synchronized with a horizontal sync. signal, a circuit for resetting the counter in response to a vertical synchronization signal within a predetermined limit so as to prohibit reset due to a non-standard signal, a memory for storing the data counted at the timing of reset, and a circuit for changing a predetermined limit prohibiting reset due to a nonstandard signal according to the data from said memory.

In accordance with a second aspect of the present invention, a vertical synchronization processing circuit is comprised of a counter for counting a clock signal synchronized with a horizontal sync. signal, a first resetting circuit for resetting the counter in response to a vertical synchronization pulse within a predetermined limit prohibiting reset due to a nonstandard signal, a circuit for discriminating an existence of a vertical synchronization interval, and a second resetting circuit for resetting the counter if the discriminating circuit detects the existence of the vertical synchronization interval when the counter counts a predetermined number of clock signals in case that there is not a vertical synchronization pulse within the predetermined limit.

The above and other objects, features, and advantages of the present invention will become apparent from the following detailed description of an illustrative embodiment thereof to be read in conjunction with the accompanying drawings.

BRIEF DESCRIPTION OF THE DRAWINGS

FIGS. 9A through 9K are respectively waveform diagrams used to explain operation of FIG. 8.

DESCRIPTION OF THE PREFERRED EMBODIMENT

The present invention will now be described in detail with reference to the drawings.

Figure 1:
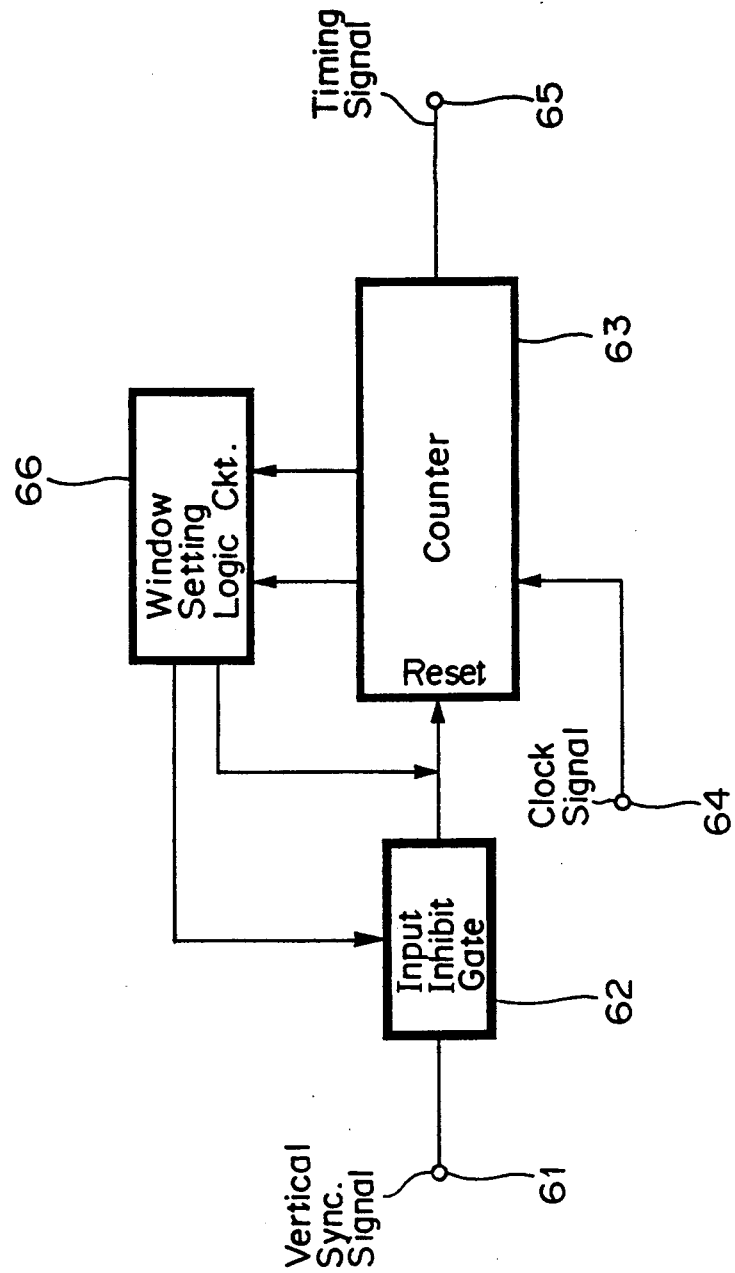
FIG. 1 is a block diagram showing circuitry according to the prior art.
Figure 2:
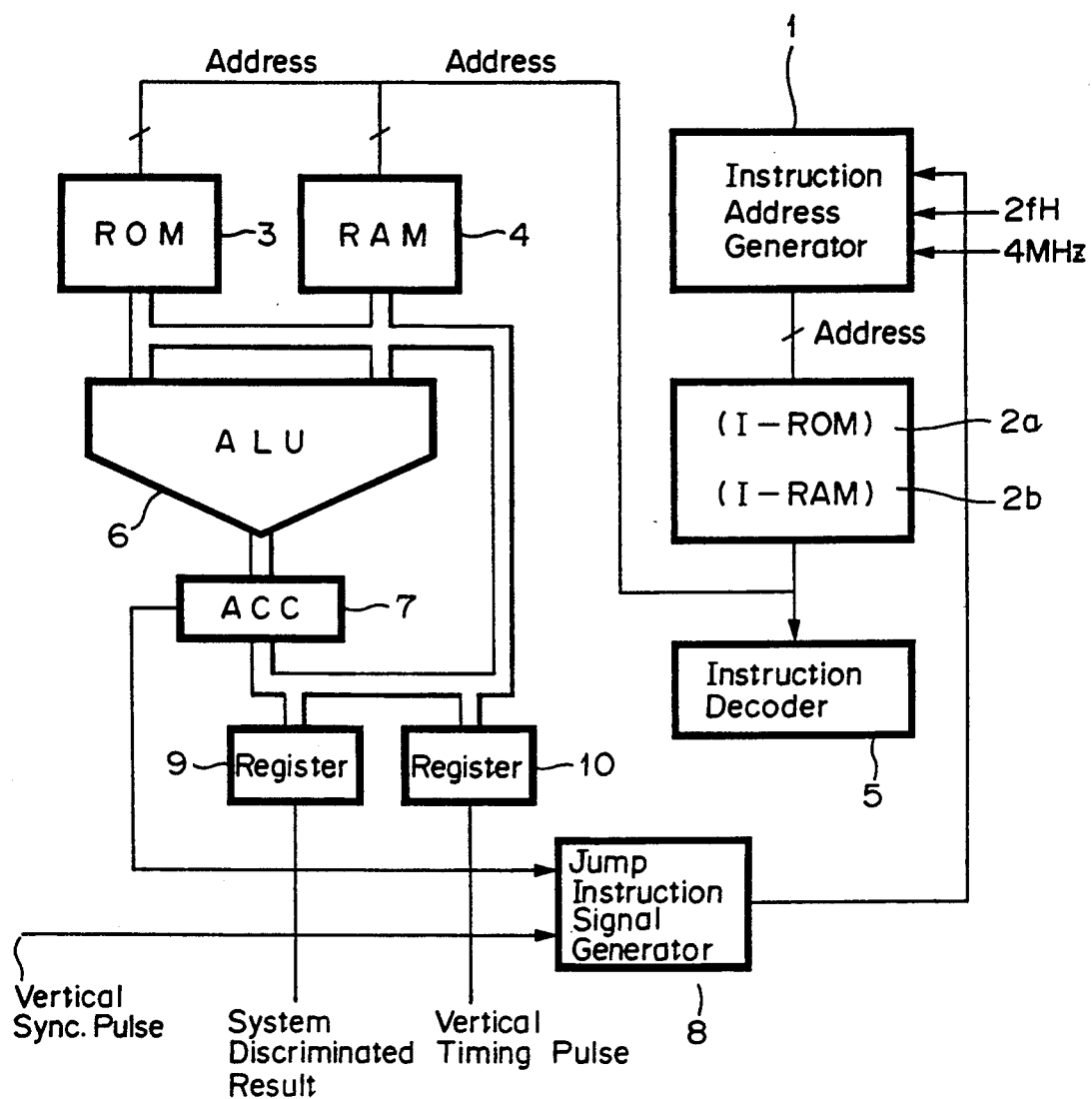
FIG. 2 is a block diagram showing an example of a hardware system that realizes a vertical synchronization processing circuit of the present invention.

FIG. 2 of the accompanying drawings shows an example of a hardware system which can realize a vertical synchronization processing circuit according to the present invention.

Referring to FIG. 2, a timing signal having a frequency twice ($2f_H$) the horizontal frequency and a clock signal of 4 MHz, for example, are supplied to an instruction address generator 1. An address generated by the instruction address generator 1 is supplied to an instruction (I)-ROM (read-only memory) 2a and an I-RAM (random access memory) 2b. Signals generated by the I-ROM 2a and I-RAM 2b are supplied to a data ROM 3 and a data RAM 4 and also to an instruction decoder 5. Further, data from the ROM 3 and the RAM 4 are supplied to an ALU (arithmetic and logic unit) 6 and an output of the ALU 6 is fed through an accumulator (ACC) 7 back to the ROM 3, the RAM 4 and the ALU 6. Operation of the ALU 6 and the accumulator 7 is controlled by a signal from the instruction decoder 5. Further, a signal from the accumulator 7 and a vertical synchronizing signal are supplied to a jump instruction signal generator 8, and a jump instruction signal from the jump instruction signal generator 8 is supplied to the instruction address generator 1. In this circuitry, calculation of a software shown in a flowchart, which will be described later, is carried out and calculated results are delivered to registers 9 and 10.

Figure 3A:
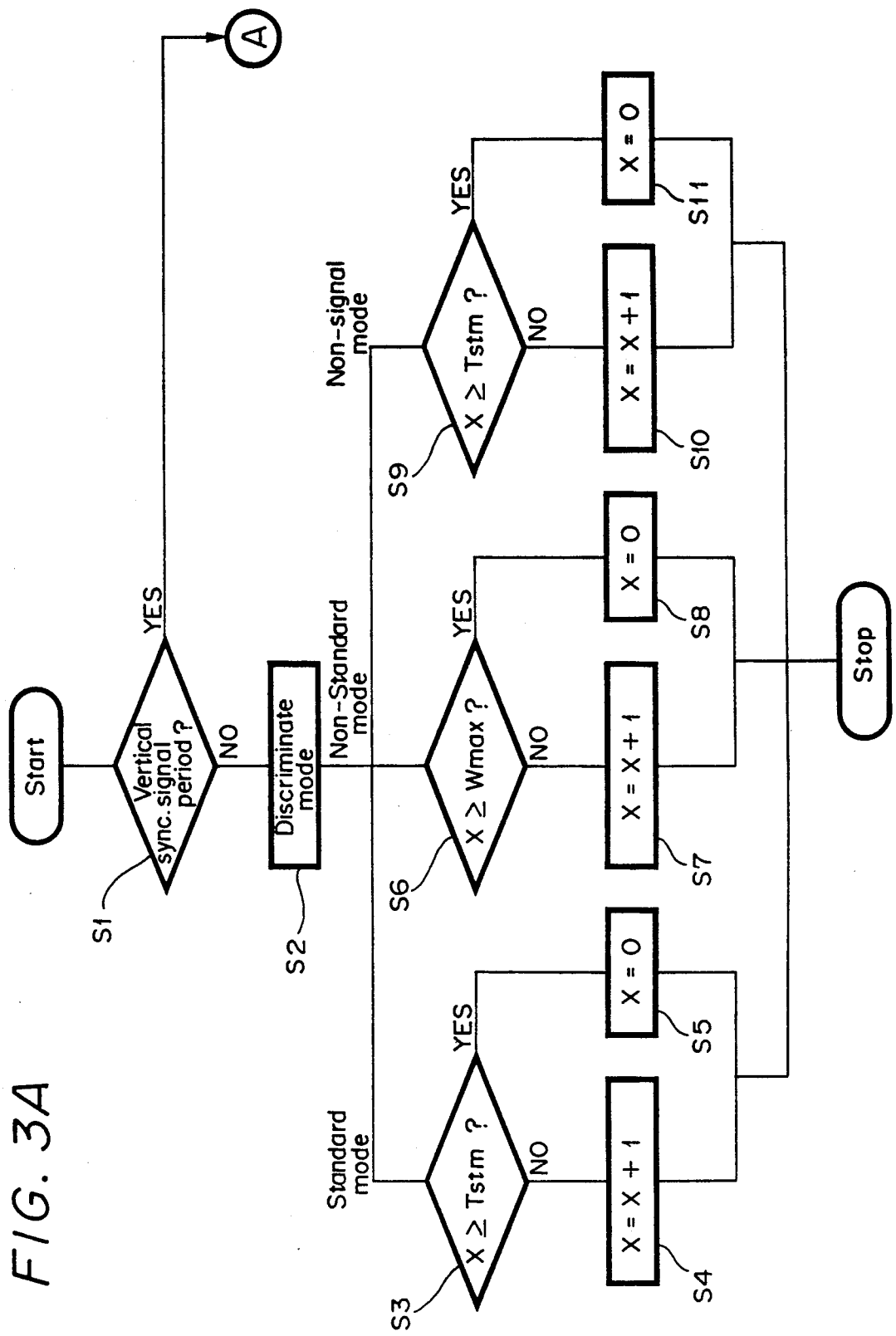
FIG. 3, which is formed of FIGS. 3A and 3B drawn on two sheets of drawings so as to permit the use of a suitably large scale, is a flowchart to which references will be made in explaining an example of a software which is used to realize the circuitry of FIG. 2.

FIG. 3 of the accompanying drawings shows a flowchart of one example of the software stored in the instruction (I)-ROM 2a and I-RAM 2b. FIG. 3 is formed of FIGS. 3A and 3B drawn on two sheets of drawings so as to permit the use of a suitably large scale. In the flowchart of FIG. 3, this software is actuated at the cycle of twice ($2f_H$) the above-mentioned horizontal frequency.

Referring to FIG. 3, following the Start of operation, it is determined in decision step S1 whether or not the period is a vertical sync. signal period. If the period is not the vertical sync. signal period as represented by a NO at decision step S1, then the processing proceeds to the next step S2, whereat the standard mode, the non-standard mode and the non-signal mode are discriminated. In step S2, the modes are discriminated on the basis of a flag which will be described later.

If the mode is determined as the standard mode in step S2, the processing proceeds to the next decision step S3. It is determined in decision step S3 whether or not a count value X is larger than or equal to a predetermined value Tstm ($X \geq Tstm$). If $X \geq Tstm$ is not established as represented by a NO at decision step S3, then "1" is added to the count value X ($X = X + 1$) in step S4. If on the other hand $X \geq Tstm$ is established as represented by a YES at decision step S3, then the processing proceeds to step S5, whereat the count value X is reset to zero ($X = 0$). Thereafter, this flowchart is stopped.

If the mode is determined as the non-standard mode in step S2, then the processing proceeds to the next decision step S6. It is determined in decision step S6 whether or not the count value X is larger than or equal to an upper limit value Wmax ($X \geq Wmax$). If $X \geq Wmax$ is not established as represented by a NO at decision step S6, then "1" is added to the count value X ($X = X + 1$) in step S7. If on the other hand $X \geq Wmax$ is established as represented by a YES at decision step S6, then the processing proceeds to step S8, whereat the count value X is reset to zero ($X = 0$). Thereafter, this flowchart is stopped.

If the mode is determined as the non-signal mode in step S2, then the processing proceeds to the next decision step S9. In decision step S9, it is determined whether or not the calculated value X is larger than or equal to the predetermined value Tstm ($X \geq Tstm$). If $X \geq Tstm$ is not satisfied as represented by a NO at decision step S9, then the processing proceeds to step S10, whereat "1" is added to the count value X ($X = X + 1$). If $X \geq Tstm$ is satisfied as represented by a YES at decision step S9, then the processing proceeds to step S 11, whereat the calculated value X is reset to zero ($X = 0$). Then, this flowchart is stopped.

If the period is determined as the vertical sync. signal period as represented by a YES at decision step S1, then the processing proceeds to step S12, whereat the standard mode, the non-standard mode and the non-signal mode are discriminated similarly to step S12. If the mode is determined as the standard mode in step S12, then the processing proceeds to the next decision step S13, whereat it is determined whether or not the count value X and the predetermined value Tstm are equal to each other ($X = Tstm$). If $X = Tstm$ is not established as represented by a NO at decision step S13, then the processing proceeds to step S14, whereat "1" is added to the count value X ($X = X + 1$). If on the other hand $X = Tstm$ is satisfied as represented by a YES at decision step S13, then the processing proceeds to step S15, whereat the count value X is reset to zero ($X = 0$). Thereafter, this flowchart is stopped.

If the mode is determined as the non-standard mode in step S12, then the processing proceeds to the next decision step S16. It is determined at decision step S16 whether or not the count value X is less than a lower limit value Wmin of a detection window, which will be referred to later, ($X < Wmin$). If $X < Wmin$ is satisfied as represented by a YES at decision step S16, then the processing proceeds to step S17, whereat "1" is added to the count value X ($X = X + 1$). If on the other hand $X < Wmin$ is not satisfied as represented by a NO at decision step S16, then the processing proceeds to step S18, whereat the system having vertical frequency of 50/60 Hz is discriminated from the count value X at that time. In the next step S19, the detection window is updated and then the count value X is reset to zero ($X = 0$) at step S20. Thereafter, this flowchart is stopped.

Further, if the mode is determined as the non-signal mode in step S12, then the processing proceeds to step S21, whereat the mode flag is set to a non-standard mode flag. In the next decision step S22, it is determined whether or not the calculated value x is larger than 100 ($X > 100$). If $X > 100$ is not established as represented by a NO at decision step S22, then the processing proceeds to step S23, whereat "1" is added to the count value X ($X = X + 1$). If on the other hand $X > 100$ is satisfied as represented by a YES at decision step S22, then the processing proceeds to step S24, whereat the count value X is reset to zero ($X = 0$). Thereafter, this flowchart is stopped. The above-mentioned software is repeatedly actuated (started) at the cycle twice ($2f_H$) of the horizontal frequency, for example.

In the initial state, the count value X is set to an initial value, 0 and the mode flag is set to the non-standard mode. Thus, the above-mentioned flowchart is driven, in the initial state, by way of a loop of steps S1, S2, S6 and S7 or S8, in that order, thereby the count value X being increased by "1" each at the cycle twice ($2f_H$) of the horizontal frequency. Thus, if the vertical sync.

signal period is not discriminated at step S1 and the count value X exceeds the upper limit value Wmax of the detection window, then the count value X is reset to zero. If this resetting is continuously carried out three times, for example, the mode flag is set to the non-signal mode. Thus, the flowchart is driven by way of a loop of steps S1, S2, S9 and S10 or S11, in that order, whereby the count value x is incremented Then, the count value of 0→Tstm is repeated.

If the vertical sync. signal period is identified in decision step S1 in the non-standard mode, the flowchart is driven by way of a loop of steps S1, S12, S16, S17 or S18, S19, S20, in that order. In the initial state, X < Wmin is satisfied as represented by a YES at decision step S16 and the vertical sync. signal period is no longer identified at decision step S1 so that the driving of the flowchart is returned by way of a loop of steps S1, S2, S9, S10 or S11. If these steps are repeated, then the driving of the flowchart is pulled in such that X < Wmin is not satisfied as represented by a NO in decision step S16.

In this state, the system having the vertical frequency of 50/60 Hz is identified at step S18. This identification is carried out if this state is repeated four times, for example. If a mean value of the count value X is approximately 625, then the system is determined as the system of 50 Hz, while if the mean value is approximately 525, then the system is determined as the system of 60 Hz. Therefore, the value of the above-mentioned predetermined value Tstm is determined to 625 when the system is 50 Hz and to 525 when the system is 60 Hz, respectively.

Under this state, the detection window is updated in step S19. The detection window is updated when this state is repeated four times, for example. Predetermined margins are added to maximum values and minimum values of the count value X during this period to provide upper and lower limit values Wmax and Wmin of the detection window.

Figure 4:
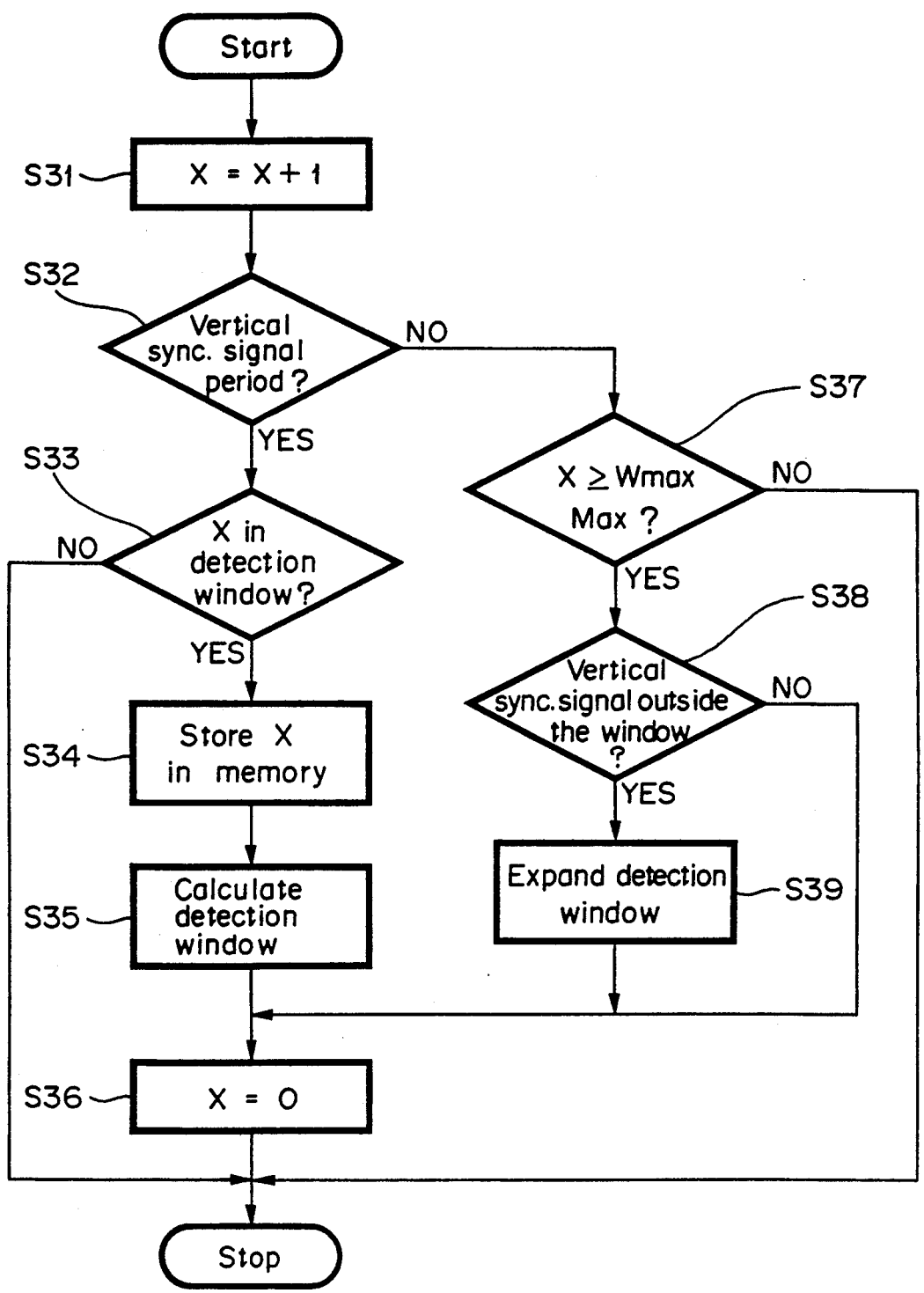
FIGS. 4 and 5 are respectively flowcharts of a main portion of FIG. 3.

FIG. 4 of the accompanying drawings shows more in detail a part of the flowchart in FIG. 3, particularly the steps for updating the detection window.

Referring to FIG. 4, following the Start of operation of the software, the count value X is incremented by "1" in step S31. It is determined in the next decision step S32 whether or not the period is the vertical sync. signal period. If the period is the vertical sync. signal period as represented a YES at decision step S32, then the processing proceeds to next decision step S33, whereat it is determined whether or no the count value X falls within the detection window. If the value X falls within the detection window as represented YES at decision step S33, then the processing proceeds to S34, whereat the count value X is stored in the memory. In next step S35, the detection window to be updated is calculate from the count value X stored. Further, in step S36, the count X is reset to zero (X=0), whereafter the flowchart is If on the other hand the count value X is not in the window as represented by a NO at decision step S33, this flowchart is stopped.

If on the other hand the period is not vertical sync. signal period as represented by a NO at step S32, then the processing proceeds to the next decision step S37, whereat it is determined whether or not the count is larger than the detection window (X>Wmax). If the count X is larger than the detection window as represented by a decision step S37, then the processing proceeds to the ne decision step S38. It is determined in decision step S38 or not the vertical sync. signal lies outside the detection window. If the vertical sync. signal lies outside the detection window as represented by a YES at decision step S38, the processing to step S39, whereat the detection window is extended in the direction in which the vertical sync. signal exists. Further, the count value X is reset to zero (X=0) in step S36. Thereafter, this flowchart is stopped. Furthermore, if the sync. signal is not out of the detection window as by a NO at decision step S38, then the count value X i reset to zero (X= 0) in step 36, whereafter this flowchart is stopped. If the count value X is not larger than the detection window as represented by a NO at decision step S37, then this flowchart is stopped.

Figure 5:
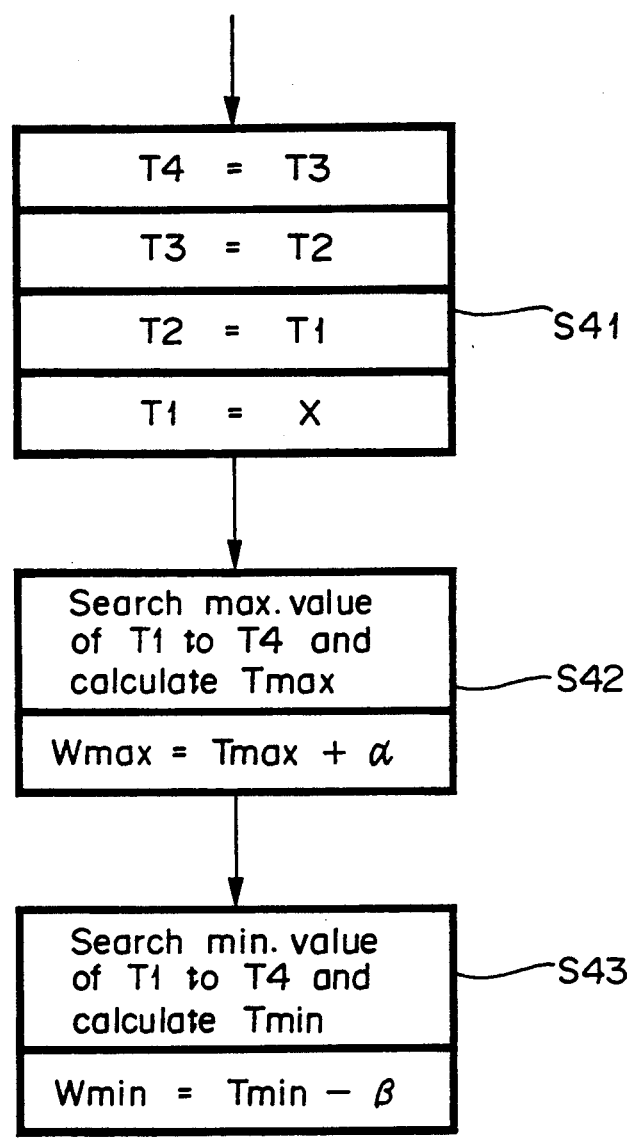

FIG. 5 of the accompanying drawings shows a flowchart used to calculate the detection window that is to be updated.

Referring to FIG. 5, in step S41, a value T4 stored in the memory is rewritten into a value T3 (T4=T3), the value T3 is rewritten into a value T2, the value T2 is rewritten into a value T1 and then the value T1 is rewritten into the count value X. Accordingly, the count values X of the past four calculations are stored in T4 to T1. In the next step S42, the maximum value Tmax of T1 to T4 is calculated, and also the following equation (1) is calculated as:

$$Wmax = Tmax + \alpha \quad (1)$$

where $\beta$ is the margin.

Further, in the next step S43, the minimum value Tmin of T4 to T1 is calculated and also the following equation (2) is calculated as:

$$Wmin = Tmin - \beta \quad (2)$$

where $\beta$ is the margin. The initial values of upper limit value Wmax and the lower limit value Wmin of the detection window are selected so as to have sufficiently large widths involving 625 and 525. Simultaneously, these values are reset to initial values at a timing point in which the mode flag is changed to the non-standard mode flag. Furthermore, when the maximum value Tmax and the minimum value Tmin are both approximately Tstm and a difference therebetween is less than a predetermined value, the mode flag is changed to the standard mode flag.

In the standard mode, this software is driven by way of a loop of steps S1, S2, S3, S4, in that order and also by way of a loop of steps S1, S12, S13, S14 or step S15. Thus, the count value X is incremented one by one at the cycle twice (2 $f_H$) of the horizontal frequency and reset to zero when X=Tstm is established, wherein the value of 0→Tsm is repeated. Whereas, when the vertical synchronizing signal is not provided, if X=Tstm is satisfied at step S3, then the count value X is reset to zero in step S5 and hence the value of 0→Tstm is repeated. Accordingly, in the standard mode, the count value X is constantly incremented one by one at the cycle twice (2 $f_H$) the horizontal frequency and reset to zero when X=Tstm is satisfied, thereby the value of 0→Tstm being repeated. Further, if the state such that the count value X is reset to zero is continuously repeated 8 times in step S5, then the mode flag is set to the non-standard mode.

Accordingly, in this flowchart, the count value X is reset to zero at the timing point in which X=Tstm is satisfied during the vertical synchronizing signal period in the standard mode. Even if the vertical synchronizing signal is dropped out but this drop-out is not continued 8 times or more, then the count value X is reset to zero at the timing point in which X=Tstm is satisfied. Thus, the vertical synchronizing signal dropped out is interpolated.

Figure 6A:
FIGS. 6A through 6F and FIGS. 7A to 7C are respectively waveform diagrams used to explain FIGS. 4 and 5.
Figure 6B:
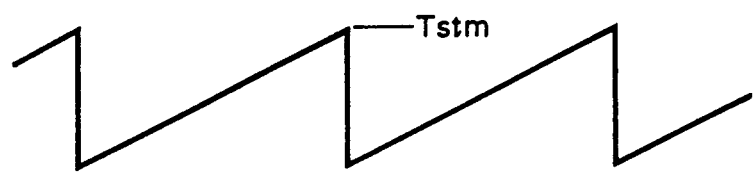
Figure 6C:
Figure 6D:
Figure 6E:
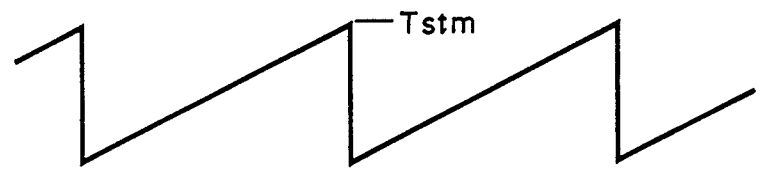

That is, in the standard mode, the count value X is changed as shown in FIG. 6B relative to an input vertical synchronizing signal shown in FIG. 6A. Then, when a vertical deflection timing pulse is generated during a period in which the count value X is higher than a predetermined value a and lower than a predetermined value b, this timing pulse becomes as shown in FIG. 6C. Whereas, when a drop-out occurs in the input vertical synchronizing signal as shown in FIG. 6D, then the count value X is changed as shown in FIG. 6E, wherein the change of the count value X is the same regardless of the drop-out occurred in the input vertical synchronizing signal.

Figure 6F:

Accordingly, by forming the vertical deflection timing pulse during the period in which the count value X is higher than the predetermined value a and is lower than the predetermined value b, this timing pulse is presented as shown in FIG. 6F, wherein the dropped-out vertical synchronizing signal is interpolated. Further, since the change of the count value X is the same in the vertical synchronizing signal thus interpolated regardless of the drop-out of the input vertical synchronizing signal, this vertical synchronizing signal is formed at the timing fully equal to the original position, thereby interpolating the vertical synchronizing signal which is free from jitter or the like.

Figure 7A:
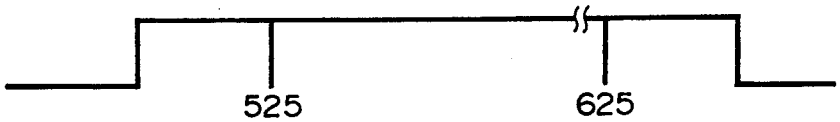
Figure 7B:
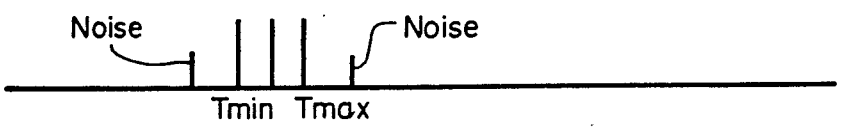
Figure 7C:

Further, in the non-standard mode, a width of the detection window is increased in the initial value as shown in FIG. 7A. When a vertical synchronizing signal is detected within this detection window shown in FIG. 7B, then the width of the detection window is changed to the width in which predetermined margins $\alpha$ and $\beta$ are added to a maximum value Tmax and a minimum value Tmin of the count value X at that time in response to the maximum and minimum values Tmax and Tmin as shown in FIG. 7C. Thus, in the initial value, the width of the detection window is large so that the discrimination (pull-in) of the vertical synchronizing signal is rapidly carried out. Also, after the vertical synchronizing signal is pulled in, the width of the detection window is narrowed, thereby making it possible to eliminate noises or the like near the vertical synchronizing signal.

Furthermore, when the interval of the vertical synchronizing signals is gradually changed in the non-standard mode, the detection window is changed following the change of the abovementioned vertical synchronizing signals so long as the above change falls within the range of the margins $\alpha$ and $\beta$, thereby making it possible to discriminate the vertical synchronizing signal in the non-standard mode. Also, when the phase of the vertical synchronizing signal is considerably changed, the vertical synchronizing signal is not detected within the detection window, for example, so that the mode flag is temporarily set to the non-signal mode. Then, the mode flag, which is set to the non-signal mode as described above, is set to the non-standard mode by the discrimination of the vertical synchronizing signal, thereby resetting the width of the detection window to the initial value. Thus, the discrimination (pull-in) of the vertical synchronizing signal can be carried out rapidly.

According to the above-mentioned circuit, since the count values during the vertical synchronizing signal period are stored and the detection window is formed on the basis of these stored values, it is possible to form the detection window which is narrow enough for the non-standard signal or the like. Therefore, the vertical synchronization processing can be carried out satisfactorily by the simple circuit arrangement.

That is, in the above-mentioned circuit, even if the dropout occurs in the synchronizing signal, the dropped-out vertical synchronizing signal is interpolated on the basis of several past synchronizing signals, thereby preventing the picture position from being displaced. Also, the width of the detection window is made variable wherein the width of the detection window is increased when the synchronizing signal is pulled-in and decreased when the synchronizing signal is stabilized, thereby eliminating noises or the like near the synchronizing signal. Thus, the jitter can be avoided. Furthermore, since the system also is discriminated by means of the same processor as that used in the above-mentioned processing, the addition of logic circuits for that purpose is not necessary and the chip area of this vertical synchronization processing circuit can be prevented from being increased when formed as an LSI (large scale integration).

In the above-mentioned circuit, the number of the count value X stored in order to calculate the detection window might be four or more. Further, the calculating method is not limited to the above-mentioned method using the maximum value Tmax and the minimum value Tmin and it is possible to employ a method in which a detection window is formed by adding predetermined margins to the front and rear of a mean value. In this case, because the margins $\alpha$ and $\beta$ influence a follow-up performance and a jitter performance, they must be arbitrarily determined in consideration of the follow-up performance and the jitter performance.

Further, in the above-mentioned circuit, the count value X corresponds to the absolute position in the vertical direction of the picture screen of the monitor receiver so that, when correction waveforms or the like of the vertical deflection waveform and the horizontal deflection waveform are formed by the calculation, the calculation can be carried out by using this count value X.

Furthermore, the reason that the count value X>100 is determined at the decision step S22 in the flowchart forming FIG. 3 is to prevent the circuit from being over-loaded due to the reduction of the vertical deflection width when the vertical synchronizing signal is frequently discriminated by erroneously detecting a noise or the like.

Figure 8:
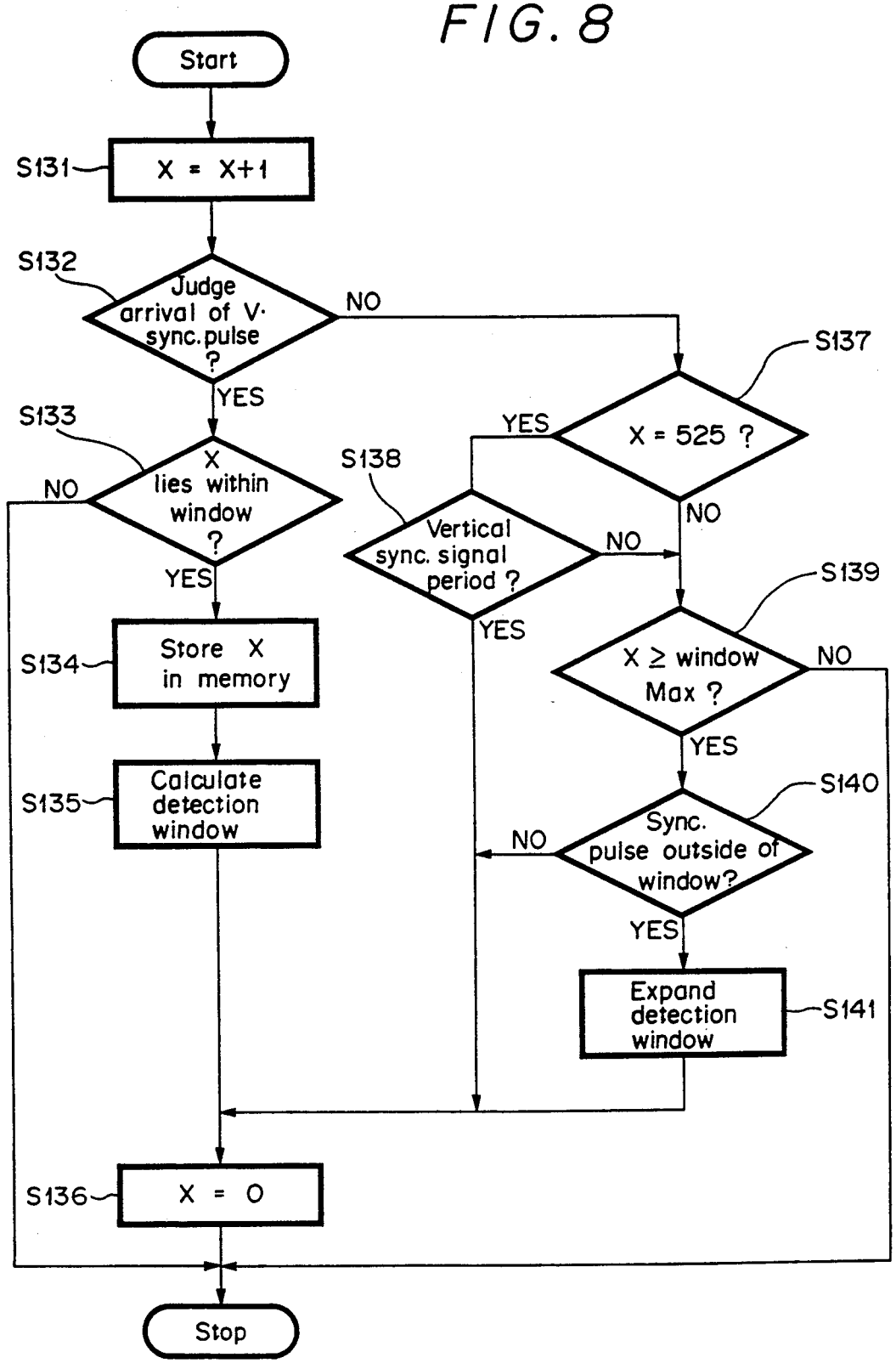
FIG. 8 shows more in detail another flowchart to which references will be made in explaining how to detect the synchronizing signal and how to update a detection window.

FIG. 8 of the accompanying drawings shows more in detail another flowchart to which references will be made in explaining how to detect the synchronizing signal and how to update the detection window.

Referring to FIG. 8, following the Start of operation, the count value X is incremented by 1 in step S131 (X=X+1). In the next decision step S132, it is determined whether or not the synchronizing pulse at the header portion of the vertical synchronizing signal period arrives. If this synchronizing pulse is already present as represented by a YES at decision step S132, then the processing proceeds to the next decision step S133, whereat it is determined whether or not the count value X lies within the detection window. If the count value X lies within the detection window as represented by a YES at decision step S133, then the processing proceeds to the next step S134, whereat the count value X is stored in the memory. Then, in the next step S135, a detection window to be updated is calculated from the count value X stored at step S134. Further, in the next step S136, the count value X is reset to zero and then the processing in this flowchart is ended (stopped). If the count value X is out of the detection window as represented by a NO at decision step S133, then the processing of this flowchart is ended (stopped).

If on the other hand the synchronizing pulse is not yet present as represented by a NO at decision step S132, then the processing proceeds to the next decision step S137, whereat it is determined whether or not the count value X is 525. If X=525 is satisfied as represented by a YES at decision step S137, then the processing proceeds to the next decision step S138, whereat it is determined whether or not the vertical synchronizing signal period is presented. If the vertical synchronizing signal period is presented as represented by a YES at decision step S138, then the processing proceeds to step S136, whereat the count value X is reset to zero. If the count value X is not equal to 525 as represented by a NO at decision step S137 and if the vertical synchronizing signal period is not presented as represented by a NO at decision step S138, then the processing proceeds to the next decision step S139. It is determined in decision step S139 whether or not the count value X is larger than the detection window. If the count value X is larger than the detection window as represented by a YES at decision step S139, then the processing proceeds to the next decision step S140, whereat it is determined whether or not the synchronizing pulse exists outside the detection window. If the synchronizing pulse exists outside of the detection window as represented by a YES at decision step S140, then the processing proceeds to step S141, whereat the detection window is expanded in the direction in which the vertical synchronizing pulse exists. Further, the count value X is reset to zero in step S136, whereafter the processing of this flowchart is ended (stopped). Further, if the vertical synchronizing signal is not present as represented by a NO at decision step S140, then the count value X is reset to zero in step S136, whereafter the processing of this flowchart is ended (stopped). Furthermore, if the count value X is not larger than the detection window as represented by a NO at decision step S139, then the processing of this flowchart is ended (stopped).

According to the above-mentioned circuit, in the normal condition, a vertical synchronizing signal period shown in FIG. 9B is separated from an input video signal shown in FIG. 9A, for example, thereby detecting a synchronizing pulse which is located at the starting portion of the vertical synchronizing signal period as shown in FIG. 9C. Whereas, it is frequently observed that a synchronization level of broadcast wave is decreased and the equalizing pulse portion is disturbed as shown in FIG. 9D due to influences, such as a distortion on a propagation path of broadcast waves, a characteristic of a repeater or the like. The disturbance of the equalizing pulse portion is changed with the level of the video signal, so that the synchronization separation malfunctions. As a result, the equalizing pulse portion is processed as a vertical synchronizing signal as shown in FIG. 9E and hence a synchronizing pulse shown in FIG. 9F is detected from the starting portion thereof. This resultant synchronizing pulse is known as "video-in sync." and the detection position of the synchronizing pulse is fluctuated depending on the picture pattern. If this synchronizing pulse is processed similarly as described above, a vertical phase jitter occurs, thereby making a picture become very difficult to see.

In accordance with the above-mentioned circuit, in the normal condition, the synchronizing pulse shown in FIG. 9C, for example, is detected from the input video signal, thereby resetting the count value X. When on the other hand the synchronization level is decreased to disturb the equalizing pulse portion so that the synchronizing pulse shown in FIG. 9F is detected, this synchronizing pulse is out of the detection window shown in FIG. 9H and hence the count value X is not reset. Then, when the count value X=525 is satisfied as shown in FIG. 9J, the presence of the vertical synchronizing signal period shown in FIG. 9E is determined in decision step S138 (see FIG. 8). Since the vertical synchronizing signal period is present as represented by a YES at decision step S139 (see FIG. 8), the count value X is reset (step S136) at that position. Hence, the count value X is reset at the same position as the position (shown in FIG. 9C) in the normal condition as shown in FIG. 9K.

As described above, according to this circuit, it is determined in decision step S138 whether or not the vertical synchronizing signal period is present when the count value of the clock signal synchronized with the horizontal synchronizing signal reaches the predetermined value (in step S137). Then, if the vertical synchronizing signal period is present as represented by a YES at decision steps S137 and S138, this count value is reset at step S136. Therefore, a signal in which the position of the synchronizing signal is displaced can be reset stably and the width of the detection window for the synchronizing signal can be reduced. Thus, it is possible to effect the satisfactory vertical synchronizing processing on the non-standard signal by the simple circuit arrangement.

More specifically, according to the above-mentioned circuit, since the reset position is determined by the count value of the counter, the vertical phase can be prevented from being changed and the occurrence of the jitter on the picture can be avoided. Further, even if the position of the synchronizing pulse is shifted in the front direction, the width of the detection window can be set to be narrow because the resetting is carried out at the correct position. There is then no risk that the incorrect synchronizing pulse shown in FIG. 9F is erroneously detected. Thus, the present invention is not limited to the video-in sync. and synchronization stability performance of various signals can be improved. Furthermore, a picture, which is free from the jitter, can be obtained unlike the prior art in which the resetting is carried out at the end of the detection window as shown in FIG. 9I when the synchronizing pulse is not detected.

In addition, while the count value X is compared with the fixed value, i.e., 525 in decision step S137 of FIG. 8 as described above, the present invention is not limited thereto and the following variant is also possible. That is, values provided when the resetting is carried out by the synchronizing pulse might be sequentially stored in the memory and the count value might be compared with a mean value of a plurality of thus stored values.

Having described a preferred embodiment of the invention with reference to the accompanying drawings, it is to be understood that the invention is not limited to that precise embodiment, and that various changes and modifications could be effected therein by one skilled in the art without departing from the spirit or scope of the invention as defined in the appended claims.

What is claimed is:

1. A vertical synchronization processing circuit comprising:
   a counter for counting a clock signal synchronized with a horizontal sync signal;
   means for resetting said counter in response to a vertical synchronization signal within a predetermined limit so as to prohibit reset due to a non-standard signal;
   means for storing the data counted at the timing of reset; and
   means for changing a predetermined limit prohibiting reset due to a non-standard signal according to the data from said storing means.

2. The vertical synchronization processing circuit according to claim 1, wherein said changing means use a plurality of data stored in said storing means.

3. The vertical synchronization processing circuit according to claim 2, wherein said plurality of data comprise maximum and minimum data counted within the vertical synchronization interval.

4. A vertical synchronization processing circuit comprising:
   a counter for counting a clock signal synchronized with a horizontal sync signal;
   first resetting means for resetting said counter in response to a vertical synchronization pulse within a predetermined limit prohibiting reset due to a non-standard signal;
   means for discriminating an existence of a vertical synchronization interval;
   second resetting means for resetting said counter if said discriminating means detects the existence of the vertical synchronization interval when said counter counts a predetermined number of clock signals in case that there is not a vertical synchronization pulse within said predetermined limit;
   means for storing the data counted at the timing of resetting the counter; and
   means for changing the predetermined limit prohibiting reset due to a non-standard signal according to the data from said storing means.

* * * * *